(12) United States Patent
Horn et al.

(10) Patent No.: US 8,689,764 B2
(45) Date of Patent: Apr. 8, 2014

(54) ROTARY ENGINE WITH EXHAUST GAS SUPPLEMENTAL COMPOUNDING

(75) Inventors: Mark David Horn, Granada Hills, CA (US); Glenn L. Havskjold, Thousand Oaks, CA (US); Calvin Q. Morrison, Jr., Thousand Oaks, CA (US)

(73) Assignee: Aerojet Rocketdyne of De, Inc., Sacramento, CA (US)

( * ) Notice: Subject to any disclaimer, the term of this patent is extended or adjusted under 35 U.S.C. 154(b) by 352 days.

(21) Appl. No.: 13/120,468

(22) PCT Filed: Oct. 8, 2009

(86) PCT No.: PCT/US2009/059957
§ 371 (c)(1),
(2), (4) Date: Mar. 23, 2011

(87) PCT Pub. No.: WO2010/042692
PCT Pub. Date: Apr. 15, 2010

(65) Prior Publication Data
US 2011/0174262 A1   Jul. 21, 2011

Related U.S. Application Data

(60) Provisional application No. 61/103,702, filed on Oct. 8, 2008.

(51) Int. Cl.
*F02B 53/08* (2006.01)
*F02B 53/04* (2006.01)
*F02B 53/00* (2006.01)

(52) U.S. Cl.
USPC ........... 123/213; 123/215; 123/212; 123/214; 123/242; 123/219

(58) Field of Classification Search
USPC ................ 123/242, 219, 212–215; 418/61.2
See application file for complete search history.

(56) References Cited

U.S. PATENT DOCUMENTS

| | | | | |
|---|---|---|---|---|
| 3,139,722 | A | | 7/1964 | Yokoi |
| 3,228,183 | A | * | 1/1966 | Fritz Feller ................. 123/213 |
| 3,236,213 | A | * | 2/1966 | Yokoi et al. ................. 123/213 |
| 3,371,654 | A | * | 3/1968 | Garside ........................ 123/213 |
| 3,528,084 | A | * | 9/1970 | Hohenlohe ................. 123/213 |
| 3,647,327 | A | * | 3/1972 | Manthey ..................... 418/61.2 |
| 3,732,689 | A | * | 5/1973 | Tado et al. ................... 123/213 |
| 3,742,917 | A | | 7/1973 | Butler, Jr. |
| 3,782,337 | A | * | 1/1974 | Feller ........................... 123/213 |
| 3,783,615 | A | * | 1/1974 | Hubers ........................ 123/213 |

(Continued)

FOREIGN PATENT DOCUMENTS

| | | | |
|---|---|---|---|
| GB | 2144489 A | * | 3/1985 |
| JP | 54057004 A | | 5/1979 |

(Continued)

OTHER PUBLICATIONS

Search Report and Written Opinion mailed May 24, 2010 for PCT/US2009/059957.

*Primary Examiner* — Thai Ba Trieu
*Assistant Examiner* — Ngoc T Nguyen
(74) *Attorney, Agent, or Firm* — Carlson, Gaskey & Olds P.C.

(57) ABSTRACT

A rotary engine which provides a supplemental phase of compression between a first phase of compression and a second phase of compression.

17 Claims, 9 Drawing Sheets

(56) References Cited

U.S. PATENT DOCUMENTS

| | | | |
|---|---|---|---|
| 3,785,352 A * | 1/1974 | Date et al. ............... | 123/242 |
| 3,835,818 A | 9/1974 | Catherwood | |
| 3,858,557 A * | 1/1975 | Myers et al. ............ | 123/213 |
| 3,908,608 A | 9/1975 | Fox | |
| 3,930,469 A * | 1/1976 | Tabaczynski ............ | 123/242 |
| 3,931,807 A | 1/1976 | Bloom | |
| 3,940,925 A | 3/1976 | Kelley | |
| 3,951,109 A | 4/1976 | Chappellier | |
| 3,970,050 A * | 7/1976 | Hoadley .................. | 418/61.2 |
| 3,971,346 A | 7/1976 | McReynolds | |
| 3,995,601 A | 12/1976 | Schwartz | |
| 4,002,152 A | 1/1977 | Hoshi | |
| 4,037,412 A | 7/1977 | Jones | |
| 4,086,880 A | 5/1978 | Bates | |
| 4,106,443 A | 8/1978 | Triulzi | |
| 4,106,472 A | 8/1978 | Rusk | |
| 4,203,410 A | 5/1980 | Ramer | |
| 4,239,469 A | 12/1980 | Kemp | |
| 4,403,581 A | 9/1983 | Rogachevsky | |
| 4,512,302 A | 4/1985 | Bunce | |
| 4,516,921 A | 5/1985 | Kemp | |
| 4,558,669 A | 12/1985 | Kemp | |
| 4,791,787 A | 12/1988 | Paul et al. | |
| 4,813,388 A | 3/1989 | Yang | |
| 4,843,821 A | 7/1989 | Paul et al. | |
| 4,912,923 A | 4/1990 | Lin | |
| 4,964,275 A | 10/1990 | Paul et al. | |
| 5,022,366 A | 6/1991 | Abraham et al. | |
| 5,101,782 A | 4/1992 | Yang | |
| 5,125,379 A | 6/1992 | Linville | |
| 5,203,307 A | 4/1993 | Burtis | |
| 5,305,721 A | 4/1994 | Burtis | |
| 5,345,758 A | 9/1994 | Bussing | |
| 5,353,588 A | 10/1994 | Richard | |
| 5,479,887 A | 1/1996 | Chen | |
| 5,497,870 A | 3/1996 | Takashi | |
| 5,513,489 A | 5/1996 | Bussing | |
| 5,640,938 A | 6/1997 | Craze | |
| 5,755,196 A | 5/1998 | Klassen | |
| 5,787,856 A | 8/1998 | Dunton | |
| 6,036,463 A | 3/2000 | Klassen | |
| 6,142,758 A | 11/2000 | Taggett | |
| 6,164,263 A | 12/2000 | Saint-Hilaire et al. | |
| 6,352,063 B1 * | 3/2002 | Weslake-Hill ............ | 123/234 |
| 6,434,939 B1 | 8/2002 | Beveridge | |
| 6,520,879 B2 | 2/2003 | Kawabata et al. | |
| 6,575,719 B2 | 6/2003 | Manner et al. | |
| 6,634,873 B2 | 10/2003 | Klassen | |
| 6,659,744 B1 | 12/2003 | Raymond, Jr. | |
| 6,739,852 B1 | 5/2004 | Klassen | |
| 6,935,840 B2 | 8/2005 | Romani et al. | |
| 7,100,566 B2 * | 9/2006 | Stanishevskaya ........ | 123/222 |
| 7,178,502 B2 | 2/2007 | Okulov | |
| 7,434,563 B2 | 10/2008 | Kim | |
| 8,312,859 B2 * | 11/2012 | Rom et al. ............... | 123/219 |
| 2010/0269782 A1 * | 10/2010 | Minick et al. ........... | 123/205 |

FOREIGN PATENT DOCUMENTS

| | | |
|---|---|---|
| JP | 3182632 A | 8/1991 |
| JP | 3194125 A | 8/1991 |
| JP | WO2006043502 | 4/2006 |
| JP | 2008138640 | 6/2006 |

\* cited by examiner

ROTARY ENGINE WITH EXHAUST GAS SUPPLEMENTAL COMPOUNDING

The present disclosure claims priority to and incorporates herein U.S. Provisional Patent Application No. 61/103,702, filed Oct. 8, 2008.

BACKGROUND

The present disclosure relates to a rotary engine.

Engine technology provides various tradeoffs between power density and fuel consumption. Gas turbine engine technology provides reasonably high power densities, but at relatively small sizes, fuel consumption is relatively high and efficiencies are relatively low. Small diesel piston engines have reasonable fuel consumption but may be relatively heavy with power densities typically below approximately 0.5 hp/lb while equivalently sized four-stroke engines have power densities typically below approximately 0.8 hp/lb. Two-stroke engines have greater power densities than comparably sized four-stroke engines, but have relatively higher fuel consumption.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
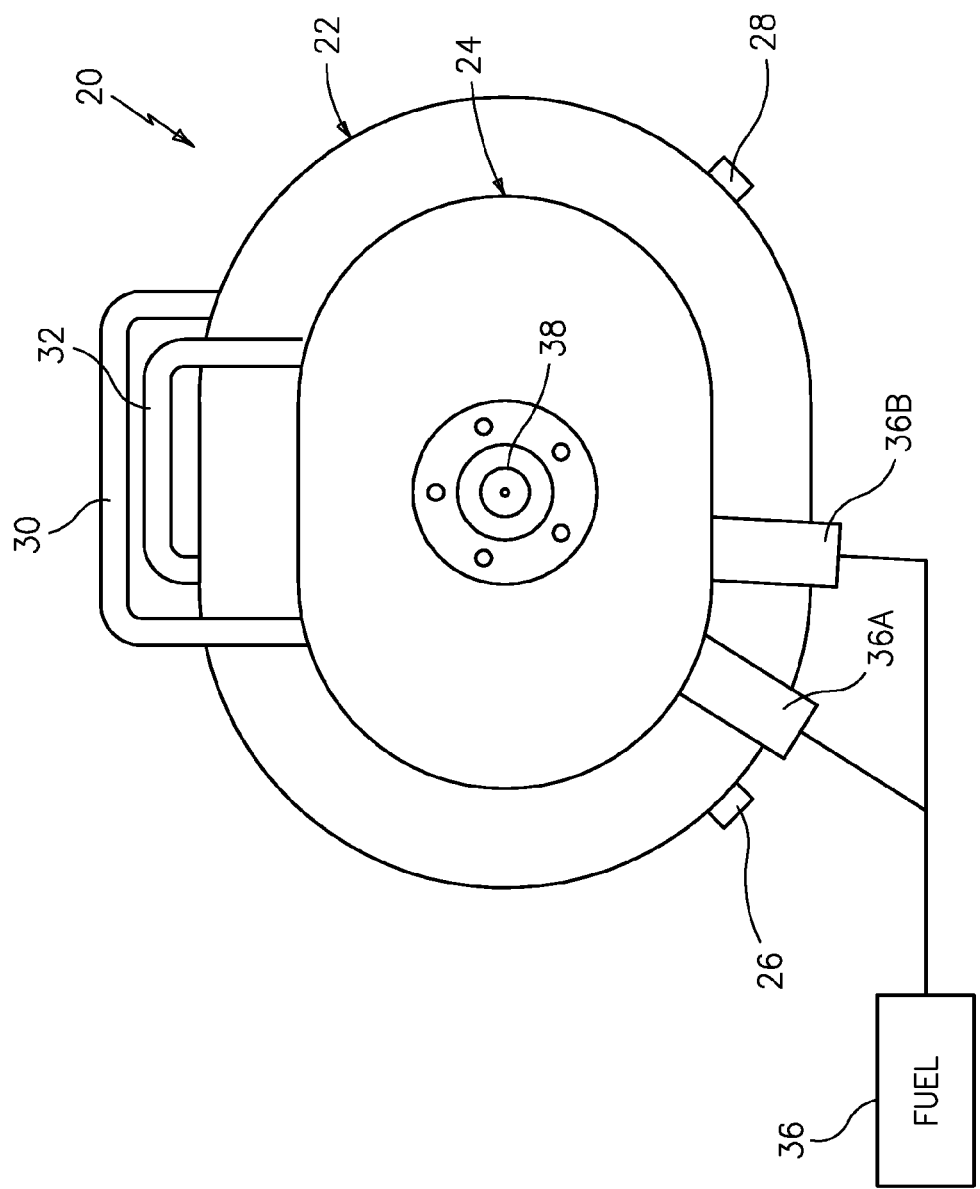
FIG. 1 is a schematic block diagram view of an exemplary rotary engine.

FIG. 1 schematically illustrates a rotary engine 20 having a first rotor section 22 and a second rotor section 24. The rotary engine 20 is based on a rotary, e.g., Wankel-type engine. An intake port 26 communicates ambient air to the first rotor section 22 and an exhaust port 28 communicates exhaust products therefrom. A first transfer duct 30 and a second transfer duct 32 communicate between the first rotor section 22 and the second rotor section 24. A fuel system 36 for use with a heavy fuel such as JP-8, JP-4, natural gas, hydrogen, diesel and others communicate with the second rotor section 24 of the engine 20. The engine 20 simultaneously offers high power density and low fuel consumption for various commercial, industrial, compact portable power generation, and aerospace applications.

Figure 2:
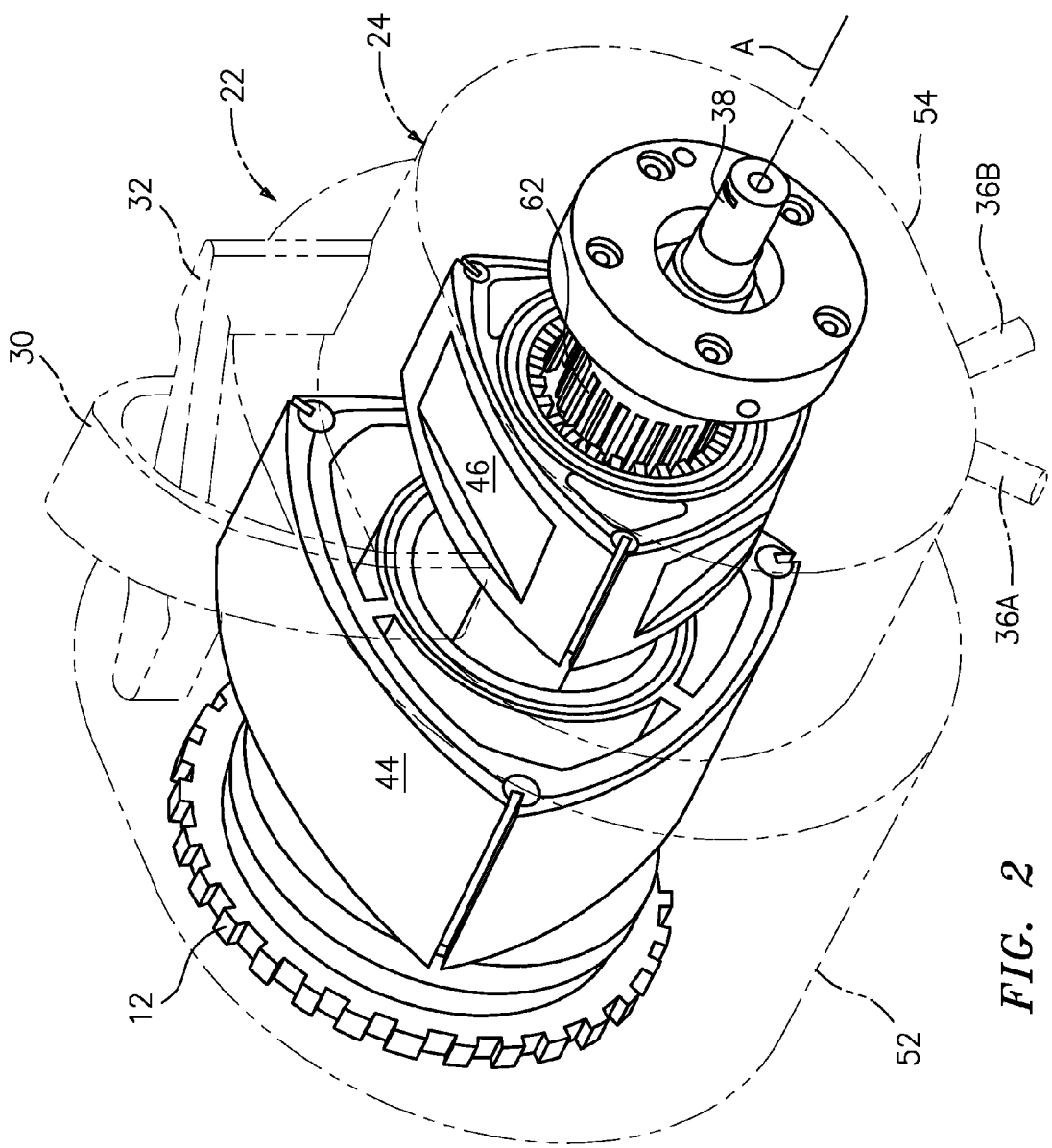
FIG. 2 is a partial phantom view of an exemplary rotary engine.
Figure 3:
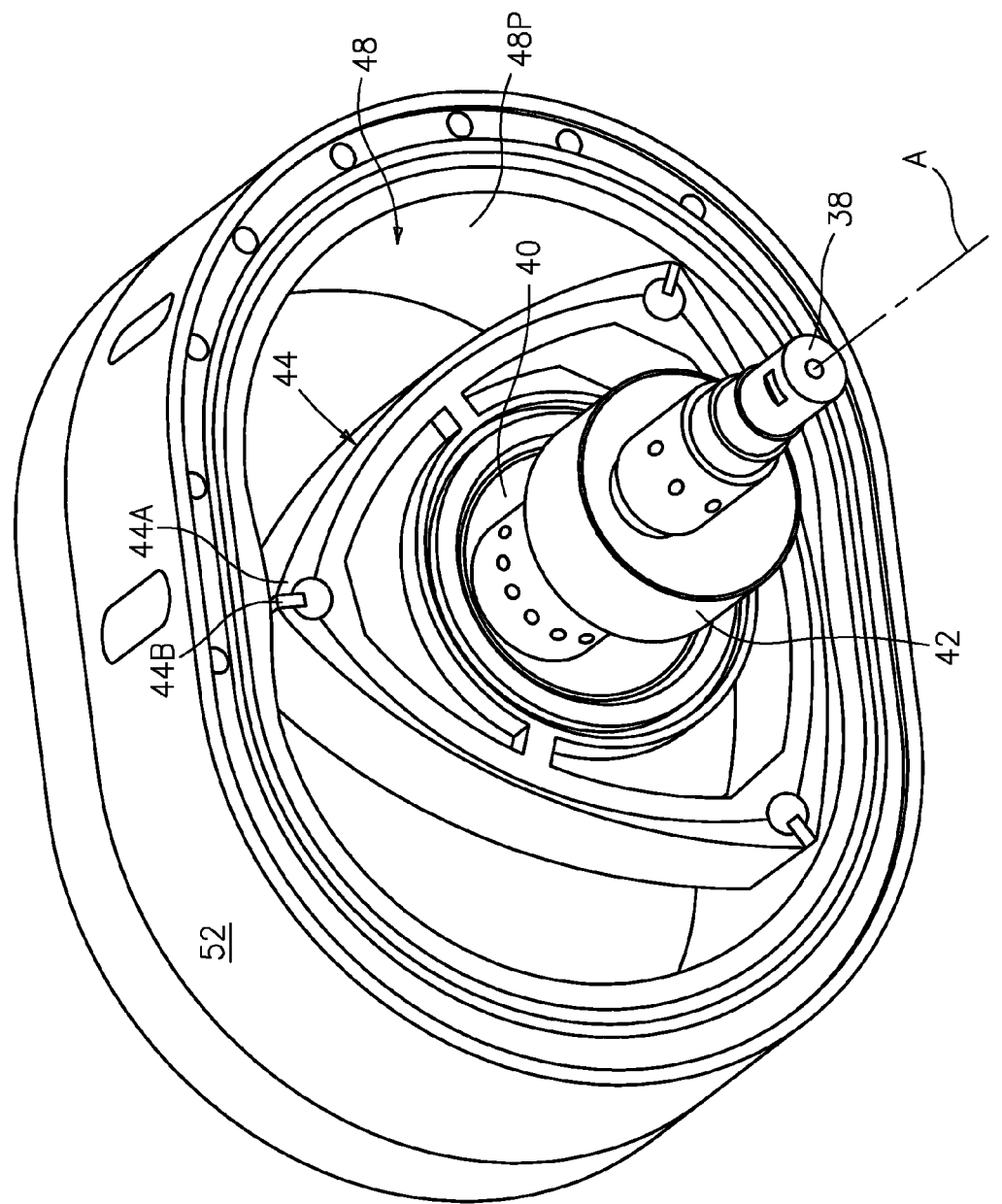
FIG. 3 is a partially assembled view of the exemplary rotary engine of FIG. 1 illustrating the first rotor section.
Figure 4:
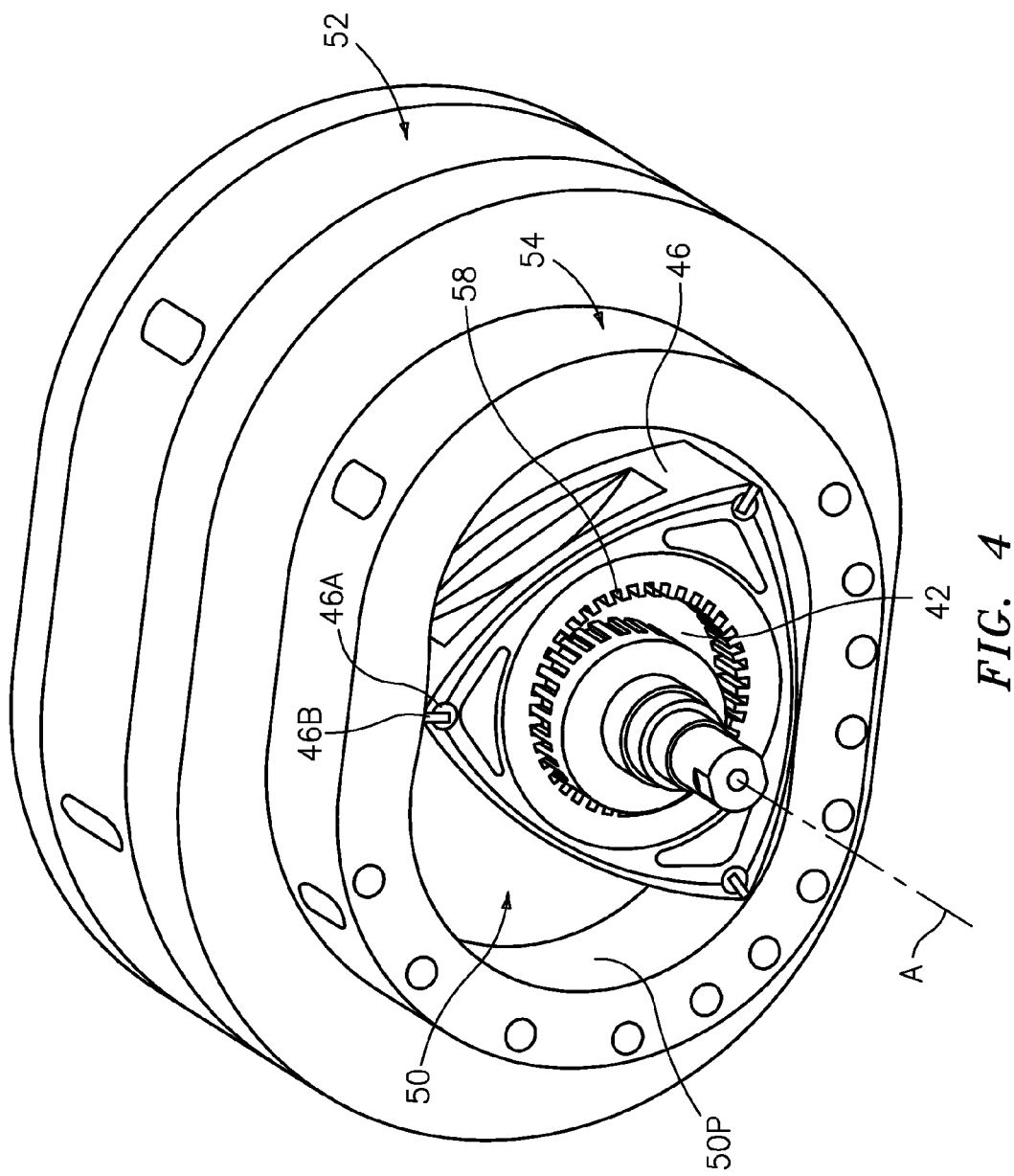
FIG. 4 is a partially assembled view of the exemplary rotary engine of FIG. 1 illustrating the second rotor section.
Figure 5:
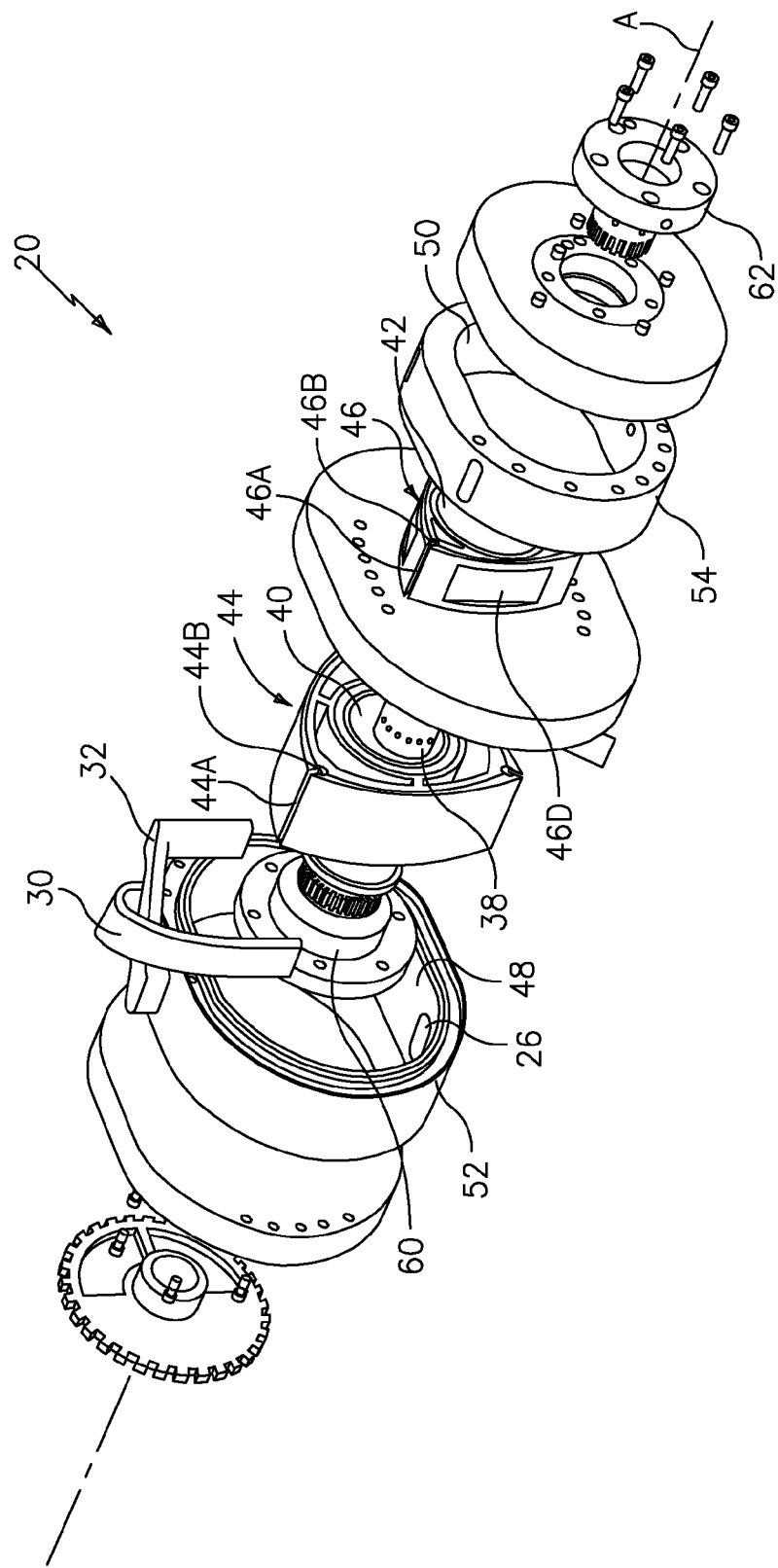
FIG. 5 is an exploded view of the rotary engine.

Referring to FIG. 2, the rotary engine 20 generally includes at least one shaft 38 which rotates about an axis of rotation A. The shaft 38 includes aligned eccentric cams 40, 42 (FIGS. 3 and 4) which drive a respective first rotor 44 and second rotor 46 which are driven in a coordinated manner by the same shaft 38. The first rotor 44 and second rotor 46 are respectively rotatable in volumes 48, 50 formed by a stationary first rotor housing 52 and a stationary second rotor housing 54 (FIGS. 3 and 4). The fuel system 36, in one non-limiting embodiment, includes one or more fuel injectors with two fuel injectors 36A, 36B shown in communication with the second rotor volume 50 generally opposite the side thereof where the transfer ducts 30, 32 are situated in one non-limiting embodiment. It should be understood that other fuel injector arrangement, locations and numbers may alternatively or additionally be provided. The fuel system 36 supplies fuel into the second rotor volume 50. The first rotor volume 48 in one non-limiting embodiment provides a greater volume than the second rotor volume 50. It should be understood that various housing configurations shapes and arrangements may alternatively or additionally be provided (FIG. 5).

The first rotor 44 and the second rotor 46 have peripheral surfaces which include three circumferentially spaced apexes 44A, 46A respectively. Each apex 44A, 46A include a apex seal 44B, 46B, which are in a sliding sealing engagement with a peripheral surface 48P, 50P of the respective volumes 48, 50. The surfaces of the volumes 48, 50 in planes normal to the axis of rotation A are substantially those of a two-lobed epitrochoid while the surfaces of the rotors 44, 46 in the same planes are substantially those of the three-lobed inner envelope of the two-lobed epitrochoid.

In operation, air enters the engine 20 through the intake port 26 (FIG. 1). The first rotor 44 provides a first phase of compression and the first transfer duct 30 communicates the compressed air from the first rotor volume 48 to the second rotor volume 50 (FIGS. 2 and 3). The second rotor 46 provides a second phase of compression, combustion and a first phase of expansion, then the second transfer duct 32 communicates the exhaust gases from the second rotor volume 50 to the first rotor volume 48 (FIGS. 2 and 4). The first rotor 44 provides a second phase of expansion to the exhaust gases, and the expanded exhaust gases are expelled though the exhaust port 28 (FIGS. 1 and 2). As each rotor face completes a cycle every revolution and there are two rotors with a total of six faces, the engine produces significant power within a relatively small displacement.

The shaft completes one revolution for every cycle, so there are three (3) crank revolutions for each complete rotor revolution. At the top dead center (TDC) position for the first rotor 44, the first rotor volume outlet port 48O and the first rotor volume inlet port 48I are in momentary communication. A supplemental compounding effect is thereby achieved as exhaust gases which are returned from the second rotor volume 50 through the second transfer duct 32 and first rotor volume inlet port 48I flow into the first rotor volume 48 then back into the first transfer duct 30 through the first rotor volume outlet port 48O for communication back into the second rotor volume 50. As the higher pressure exhaust gases are forced into the fixed volume of the first transfer duct 30, the residual compressed air within the first transfer duct 30 is forced into the second rotor volume 50. The residual compressed air from within the first transfer duct 30 is communicated into the second rotor volume 50 which thereby increases the effective compression ratio of the engine 10 through movement of the additional or supplemental air mass flow into the second rotor volume 50 to thereby increase or the initial pressure prior to the start of the second rotor 46 compression stroke. With the fixed, geometry defined compression ratio of the second rotor 46, the higher initial pressure for the second rotor 46 stroke results in a higher peak pressure from combustion. This higher pressure, combined with the increased air mass capture, results in increased power output for the engine 10.

Figure 6:
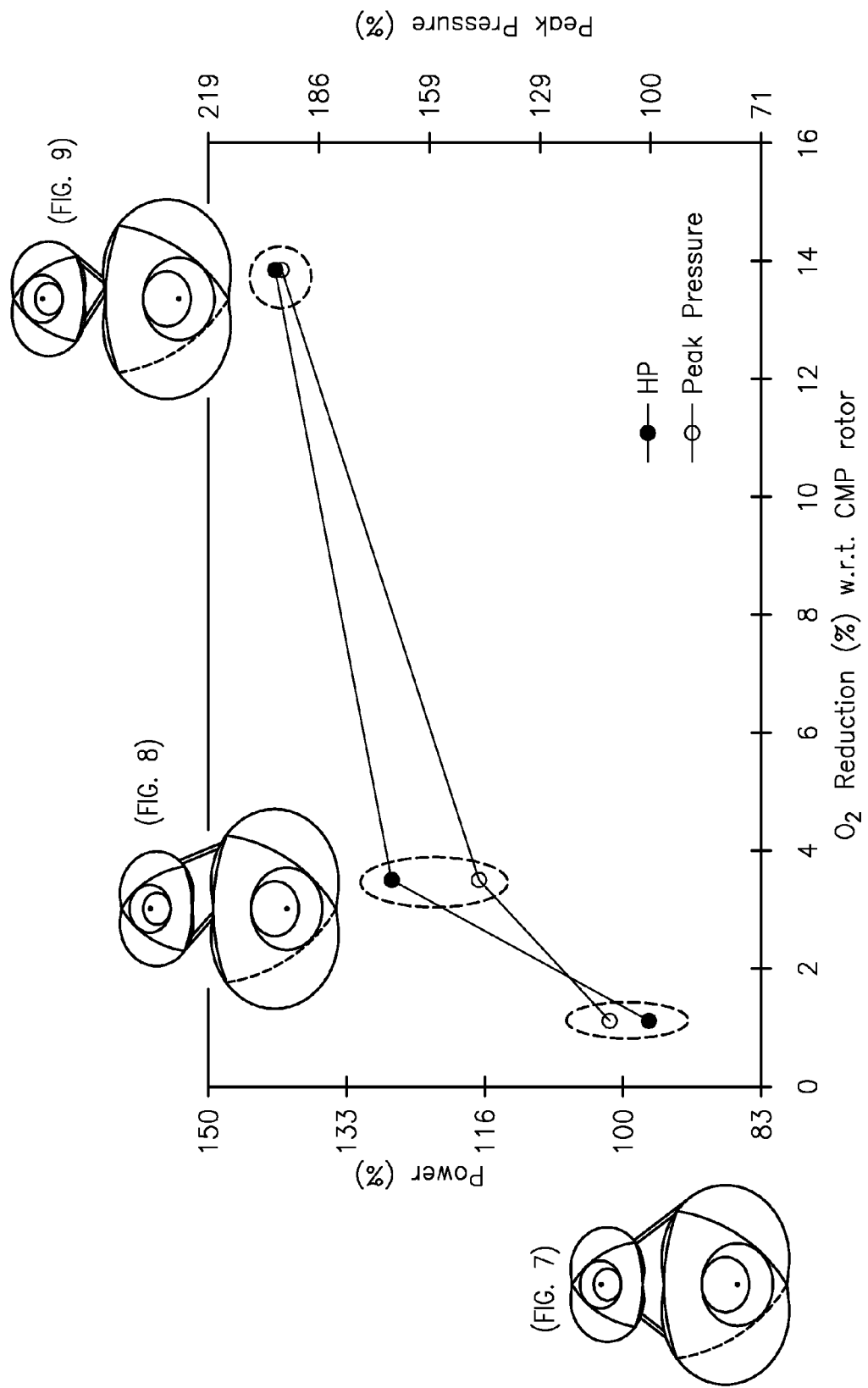
FIG. 6 is a graphical representation of horsepower and peak pressure with respect to oxygen mass fraction within the first rotor section for various first rotor inlet port and first rotor outlet port relationships with the second rotor section schematically translated up and rotated 180 degrees about horizontal and vertical axes for illustrative purposes.

Referring to FIG. 6, the supplemental compounding effect may be tuned based on the first rotor volume outlet port 48O and the first rotor volume inlet port 48I geometric relationship. That is, the degree of supplemental compounding is controllable through the relationship of first rotor volume inlet port 48I, first rotor volume outlet port 48O and the volume of the respective feed duct 30, 32.

In one non-limiting embodiment, a relatively small amount of exhaust flow from the second rotor 46 is used to further charge the compressed air without actually ingesting exhaust gas into the second rotor volume 50. In other words, a relatively small portion of the exhaust gas flows from the second rotor volume 50 into the air charge of the first transfer duct 30 to provide minimal exhaust recirculation.

In another non-limiting embodiment, a more significant portion of exhaust gas is used to first push the compressed air from within the first transfer duct 30 into the second rotor volume 50 and further heat the second rotor intake charge air such that some portion of the exhaust gas flows into the second rotor volume 50 intake charge air as well. Although there may be a temperature effect, this is secondary to the pressure increase. Generally, the greater the portion of exhaust gas that is pushed in, the greater the supplemental compounding effect. That is, the basic effect is one of more moles of air within a fixed volume prior to the start of the second rotor compression stroke.

Both of the disclosed non-limiting embodiments result in increased efficiency and power which boosts the compression ratio. For each embodiment, there is also a continuum of design options based on the relationship of first rotor volume inlet port 48I and the first rotor volume outlet port 48O that achieve the same basic cycle functionality but to different extents.

Figure 7:
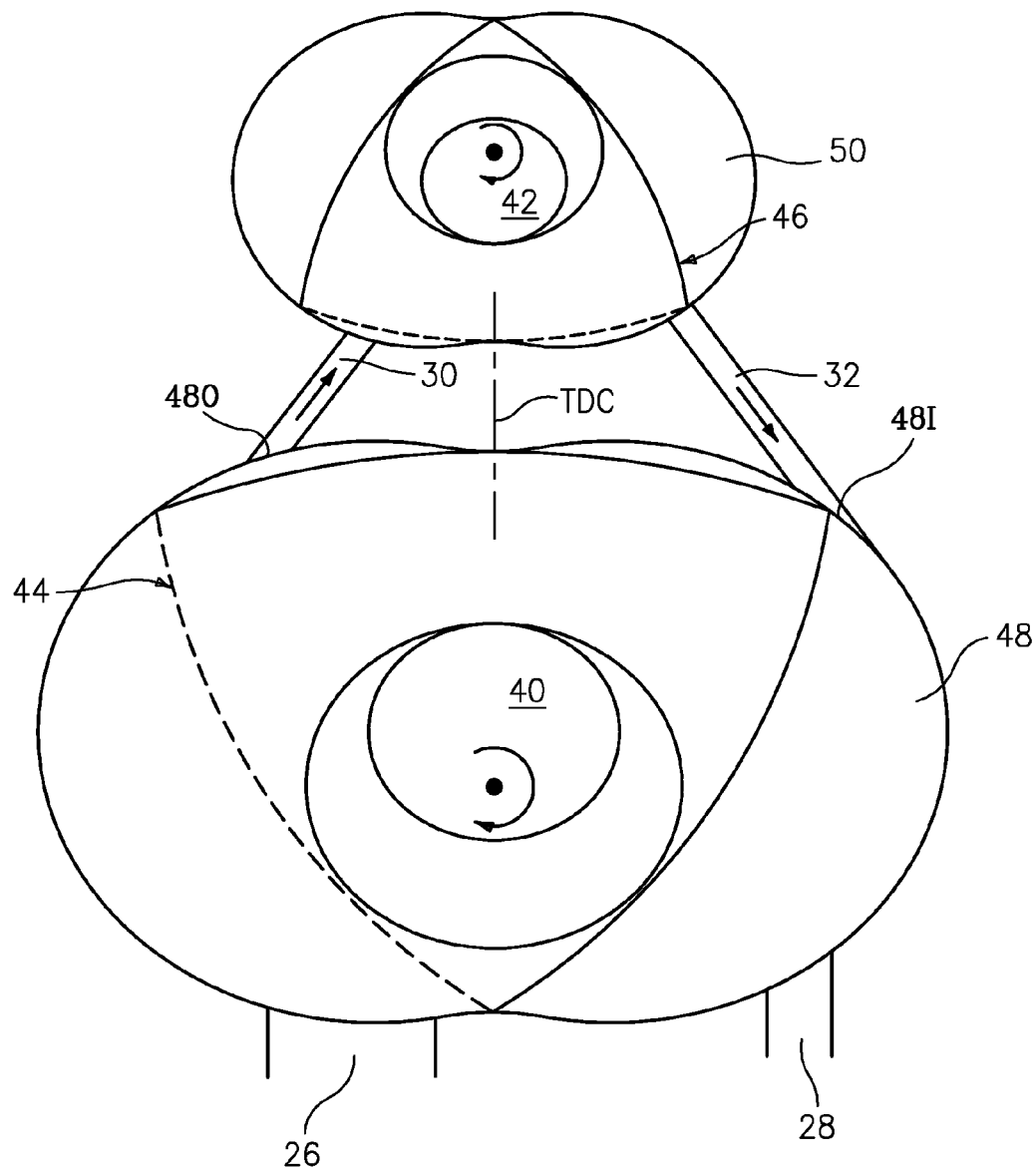
FIG. 7 is one non-limiting embodiment of a first rotor inlet port and first rotor outlet port relationships with the second rotor schematically translated up and rotated 180 degrees about horizontal and vertical axes for illustrative purposes.

In one non-limiting embodiment, the first rotor volume outlet port 48O and the first rotor volume inlet port 48I are located on either side of the first rotor volume 48 top-dead-center (TDC) position (FIG. 7). Such an arrangement, in one example, provides approximately 58 HP at 1600 psi.

Figure 8:
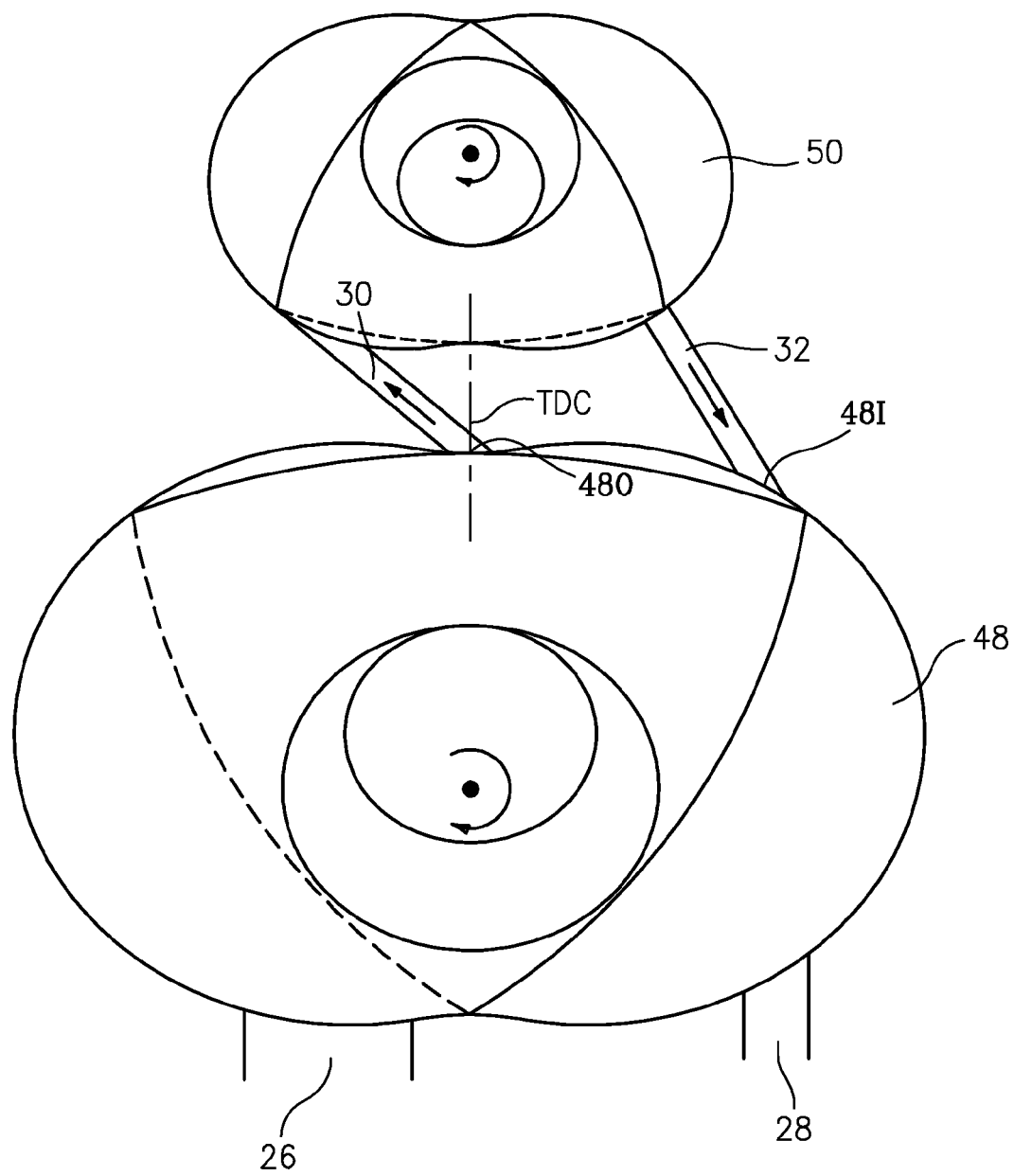
FIG. 8 is another non-limiting embodiment of a first rotor inlet port and first rotor outlet port relationships with the second rotor schematically translated up and rotated 180 degrees about horizontal and vertical axes for illustrative purposes.

In another non-limiting embodiment, the first rotor volume outlet port 48O is located proximate the first rotor volume 48 TDC position and the first rotor volume inlet port 48I is located on a rotationally downstream side of the TDC position (FIG. 8). Such an arrangement provides approximately 76 HP at 2000 psi within the same engine of that in the FIG. 6 example.

Figure 9:
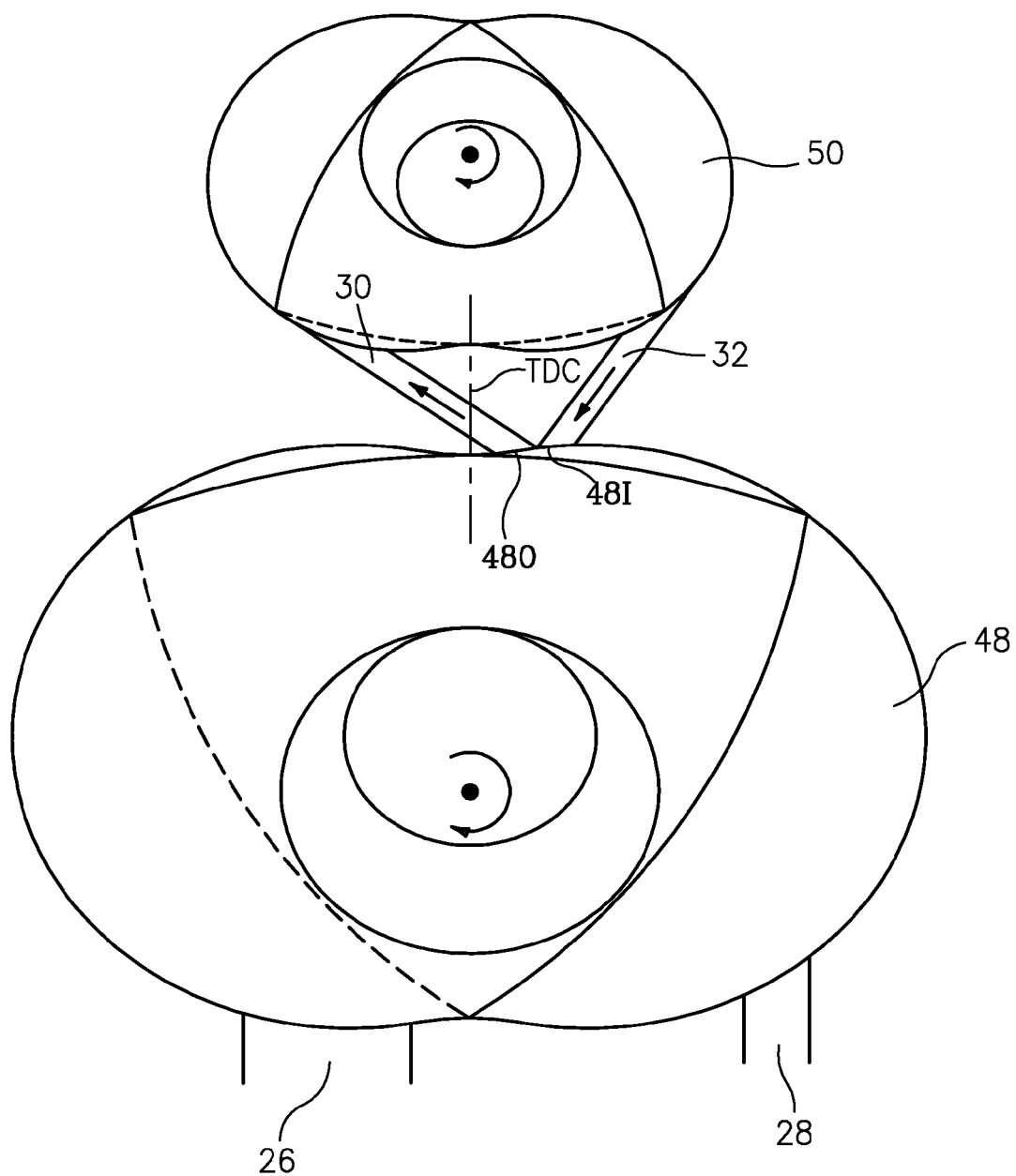
FIG. 9 is another non-limiting embodiment of a first rotor inlet port and first rotor outlet port relationships with the second rotor schematically translated up and rotated 180 degrees about horizontal and vertical axes for illustrative purposes.

In another non-limiting embodiment, the first rotor volume outlet port 48O and the first rotor volume inlet port 48I are both located on a rotationally downstream side of TDC position (FIG. 9). The first rotor volume outlet port 48O and the first rotor volume inlet port 48I are located in directly adjacent relationship such that first rotor volume outlet port 48O and the first rotor volume inlet port 48I essentially form one port in communication with the first rotor volume 48. The essentially combined first rotor volume outlet port 48O and first rotor volume inlet port 48I are located adjacent to the TDC position. Such an arrangement provides approximately 85 HP at 2750 psi within the same engine of that in the FIG. 7 example.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of supplemental compression for a rotary engine comprising:
   communicating exhaust gases from a second stage rotor volume radially into a first stage rotor volume through a second transfer duct therebetween; and
   forcing compressed air within a first transfer duct between said first stage rotor volume and said second stage rotor volume radially into said second stage rotor volume with said exhaust gases; and
   communicating said exhaust gases from said second stage rotor volume through a port and forcing said compressed air between said first stage rotor volume and said second stage rotor volume through same port.

2. A method as recited in claim 1, further comprising:
   locating said port at a first stage rotor top-dead-center (TDC) position.

3. A method as recited in claim 1, further comprising:
   offsetting said port from a first stage rotor top-dead-center (TDC) position.

4. A method as recited in claim 1, further comprising:
   recirculating at least a portion of said exhaust gases from said second stage rotor volume within said second stage rotor volume.

5. A method as recited in claim 1, further comprising:
   delivering fuel to said second stage rotor volume along a passageway outside said first and second transfer ducts.

6. A rotary engine comprising:
   a first rotor section which provides a first phase of compression;
   a second rotor section in communication with said first rotor section, said second rotor section provides a second phase of compression, a combustion phase and a first phase of expansion, said second rotor section in communication with said first rotor section such that said first rotor section provides a second phase of expansion, an exhaust gas from said first phase of expansion provides a supplemental phase of compression between said first phase of compression and said second phase of compression; and
   a first transfer duct which communicates compressed air from said first rotor section through a first rotor volume outlet port to said second rotor section and a second transfer duct which communicates exhaust gases from said second rotor section to said first rotor section through a first rotor volume inlet port, said first rotor volume outlet port and said first rotor volume inlet port are located to one side of a first stage rotor top-dead-center (TDC) position, wherein said first rotor volume outlet port and said first rotor volume inlet port form one port in communication with said second rotor section.

7. A rotary engine comprising:
a first rotor section which provides a first phase of compression;
a second rotor section in communication with said first rotor section, said second rotor section provides a second phase of compression, a combustion phase and a first phase of expansion, said second rotor section in communication with said first rotor section such that said first rotor section provides a second phase of expansion, an exhaust gas from said first phase of expansion provides a supplemental phase of compression between said first phase of compression and said second phase of compression; and
a first transfer duct to communicate compressed air between said first rotor section and said second rotor section, said first transfer duct includes a portion that extends radially outside a radial perimeter of said first rotor section;
a second transfer duct to communicate exhaust gases between said second rotor section and said first rotor section;
  wherein said first transfer duct being in fluid communication with said second transfer duct via a port positioned on a periphery of said first rotor section.

8. The rotary engine as recited in claim 7, wherein said supplemental phase of compression includes communication of the exhaust gas from said first phase of expansion to charge said first phase of compression.

9. The rotary engine as recited in claim 8, wherein the exhaust gas from said first phase of expansion is not recirculated to said first phase of expansion.

10. The rotary engine as recited in claim 8, wherein the exhaust gas from said first phase of expansion increases airflow in said second phase of compression.

11. The rotary engine as recited in claim 10, wherein the exhaust gas from said first phase of expansion adds heat to said second phase of compression.

12. The rotary engine as recited in claim 10, wherein the exhaust gas from said first phase of expansion is at least partially recirculated.

13. The rotary engine as recited in claim 7, wherein said second transfer duct communicates exhaust gases from said second rotor section to said first rotor section through said port.

14. The rotary engine as recited in claim 7, wherein said port is located to one side of a first stage rotor top-dead-center (TDC) position.

15. The rotary engine as recited in claim 14, wherein said port is located on a rotationally downstream side of a first stage rotor top-dead-center (TDC) position.

16. The rotary engine as recited in claim 7, wherein said first transfer duct communicates radially into said second rotor section.

17. The rotary engine as recited in claim 7, including a fuel injector to deliver fuel, wherein said fuel injector is separate from said transfer duct.

* * * * *